United States Patent Office 3,439,145
Patented Apr. 15, 1969

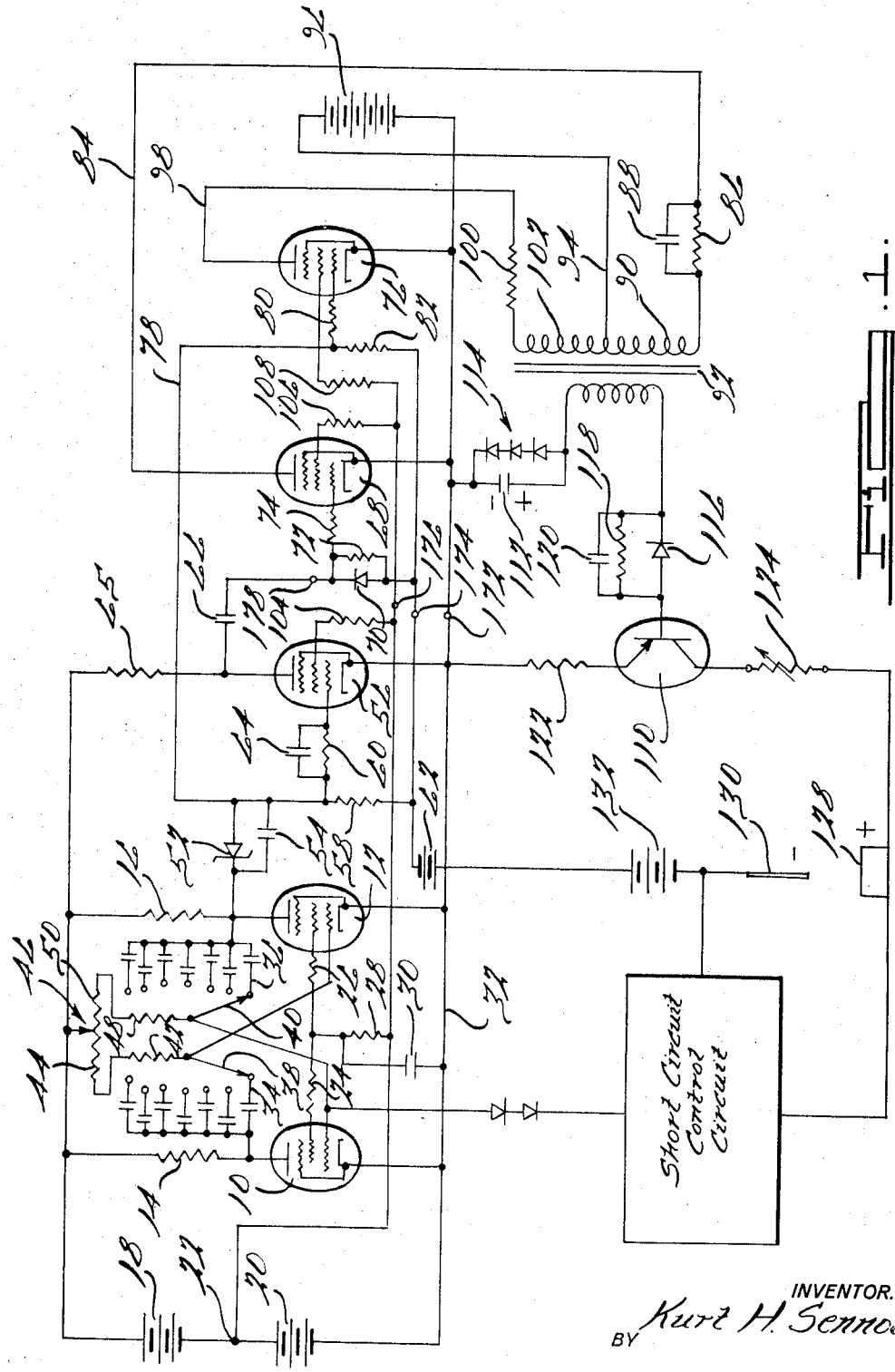

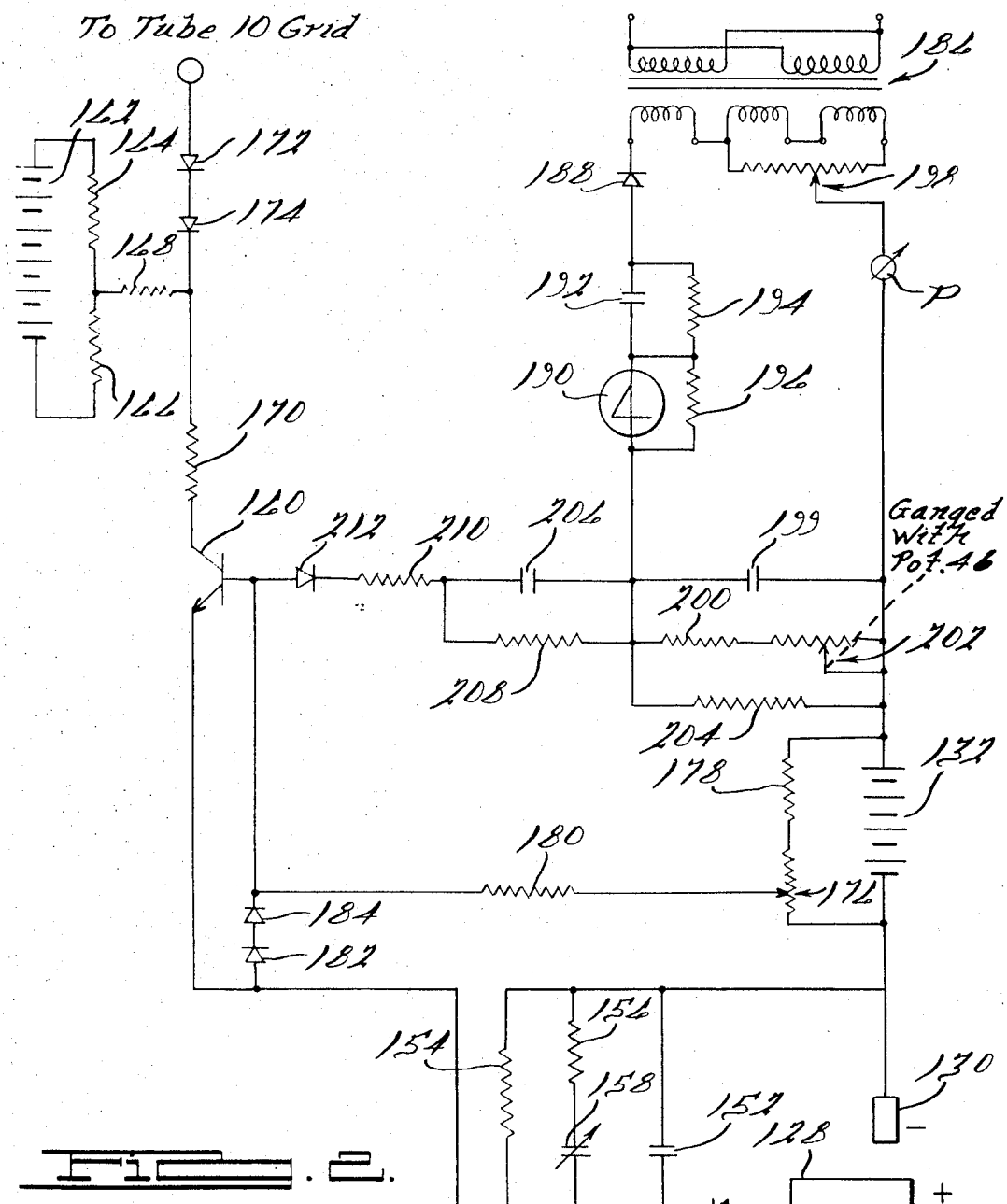

3,439,145
ELECTRICAL DISCHARGE MACHINING POWER SUPPLY CIRCUIT
Kurt H. Sennowitz, Royal Oak, Mich., assignor, by mesne assignments, to Elox Inc., Troy, Mich., a corporation of Delaware
Filed Mar. 4, 1966, Ser. No. 531,856
Int. Cl. B23k 9/10
U.S. Cl. 219—69     8 Claims

ABSTRACT OF THE DISCLOSURE

A gap short circuit system for an electrical discharge machining power supply in which machining pulses are provided by a switch at predetermined frequency and on-off time. The system includes a network for sensing abnormal gap condition, a means for providing substantially lower and variable frequency cut-off pulses to the switch in response to such condition and a means for directly varying the time duration of the cut-off pulses relative to the off time of the machining pulses.

---

Electrical discharge machining, sometimes referred to in the art as EDM, spark machining, or arc machining, is carried on by passing a series of high current density electrical discharges across a gap between a tool electrode and a conductive workpiece at sonic or ultrasonic frequencies in the presence of a dielectric fluid for removing material from the workpiece.

In electrical discharge machining, the tool electrode is maintained in proximate position with the workpiece by a automatic servo feed and is advanced toward or into the workpiece as material is removed therefrom.

A fluid coolant, usually a liquid, is circulated through the work gap to flush the workpiece particles from the gap. The coolant is sometimes furnished under pressure by a pump through one or more holes in the electrode. One defining characteristic of electrical discharge machining is that the coolant is a dielectric such as kerosene, transformer oil or distilled water and is broken down in minute, localized areas by the action of the machining power supply between the closest points of the tool electrode and workpiece.

In the operation of the power supply to provide machining pulses to the gap at high frequency at sonic or ultrasonic frequencies, gap short circuit condition sometimes occurs which condition results in extreme localized heat and may result in damage to tool electrode, workpiece, or both. This problem becomes particularly important where the power supply provides machining pulses of extremely high current ranging as high as 300 amperes.

Accordingly, it is the principal object of this invention to provide a short circuit protective system for an electrical discharge machining power supply circuit in which machining pulses are provided to the gap by one or more electronic switches of variable duty factor, in which a sensing network is connected to the gap for providing an output responsive to abnormal gap circuit condition, and in which an improved cut-off means is included to pulse the switch at a substantially reduced frequency for the duration of the condition with the cut-off pulse duration preset in accordance with the switch duty factor.

It is an additional object of this invention to provide a short circuit protective system for electrical discharge machining apparatus in which the cut-off system includes a shaping network effective to protect the cut-off switch from line voltage transients and component failure.

In the following specification, the term electronic switch is frequently employed. By "electronic switch" I mean any electronic control device having three or more electrodes comprising at least two principal or power electrodes acting to control current flow in the power circuit, the conductivity between the principal electrodes being controlled by a control electrode within the switch whereby the conductivity of the power circuit is controlled statically or electrically without movement of mechanical elements within the switch. Included within this definition are vacuum tubes and transistors in which turn-on is accomplished by a control voltage applied to the control electrode and in which turn-off is accomplished automatically in response to the removal of that control voltage. Also included in the definition are devices of the gate type in which turn-on is accomplished by a control voltage applied to the control electrode which control voltage may be then removed and in which turn-off is accomplished by application of a subsequent control voltage to the control electrode. An additional class of electronic switches called electronic trigger devices falls within this definition and includes ignitrons, thyratrons, and semiconductor controlled rectifiers. By "electronic trigger device" I mean any electronic switch of the type which is triggered on at its control electrode by a pulse and is turned off by reverse voltage applied for a sufficient time across its principal electrodes.

Other objects and advantages of the present invention are disclosed in the following specification which, taken in conjunction with the accompanying drawings, shows a preferred form of apparatus for practicing the invention.

In the drawings, in which reference numerals have been used to designate like parts herein referred to:

FIG. 1 shows in schematic form an electrical pulse generating and amplifying circuit having a variable on-off ratio at several different pulse repetition rates; and FIG. 2 is a schematic drawing showing the detail of the improved short circuit protective system.

Referring now to the drawing of FIGURE 1, a pulsating drive signal is generated by an astable multivibrator including a pair of electron tubes 10, 12 biased and coupled for alternate operation. Tubes 10 and 12 are connected respectively through plate load resistors 14 and 16 to the positive terminal of anode supply 18. The negative terminal of D.C. supply 18 is in turn connected to the positive terminal of supply 20. Power supplies 18 and 20 together comprise the anode power supply for the multivibrator and first stage of amplification. A tap 22 connects between supplies 18 and 20 to provide screen voltage for the various stages of pentode amplification. The screen grid of tube 10 connects through a resistor 24 to the common screen tap of the multivibrator circuit. The screen grid of tube 12 connects through a resistor 26 to the common tap which is in turn connected through a resistor 28 to screen tap 22 of the main supply. A bypass capacitor 30 connects the common junction of resistors 24, 26 and 28 to the common ground of the system which is represented by a lead 32.

Typical cross-coupling capacitors 34 and 36 are selected by frequency selector switches 38 and 40 and cross-couple the anodes of tubes 10 and 12 to the opposing grid. The control grid of tube 12 is returned to the positive terminal of the anode power supply through a limiting resistor 42 and a portion 44 of rheostat 46. The control grid of tube 10 is similarly returned through a limiting resistor 48 and portion 50 of rheostat 46; thus completing the connection of the multivibrator circuit itself.

The signal output of multivibrator tube 12 generated across resistor 16 is coupled through a reference diode 52 and shunt connected capacitor 54 to the control grid circuit of a pentode amplifier 56. The negative terminal of reference diode 52 and capacitor 54 is connected to the junction between resistors 58 and 60 as shown.

Resistor 58 returns the grid of tube 56 to negative bias 62 and during periods of off-time for tube 56 maintains this tube nonconductive. Resistor 60 limits grid current during periods of on-time thus decoupling the control grid of tube 56 from the multivibrator circuit. A small magnitude capacitor 64 is connected across resistor 60 to provide sharp leading edge drive to tube 56 thereby insuring sharp switching characteristics of this tube. The output of tube 56 is developed across a plate load resistor 65 which returns the anode of tube 56 to the anode power supply 18. A coupling capacitor 66 couples the signal output of tube 56 to the grid of drive tube 68. The grid of tube 68 is clamped to bias 62 through a diode 70. A resistor 72 is connected in parallel with diode 70 to provide off bias for tube 68 during periods of its nonconduction. A resistor 74 limits the grid current to tube 68 in a manner similar to resistor 60 of tube 56.

The control grid of a tube 76 is returned by a lead 78 to the negative terminal of reference diode 52. A resistor 80 limits grid current from tube 76 and a resistor 82 provides a localized bias return for this tube. Amplifier tubes 68 and 76 are generally comprised of a bank of several tubes for providing sufficient drive power to successive stages. The anode of tube 68 is connected through a lead 84 to a network comprising resistor 86 and shunt connected capacitor 88. The opposite side of this network is connected to one side of a primary 90 of drive coupling transformer 92. A lead 94 provides a center tap connection for the primary of this transformer and connects the anode circuit of tube 68 to the positive terminal of a drive power supply 96. Tube 76 is connected to a lead 98 to a resistor 100 which returns the anode of tube 76 through a portion 102 of the primary of transformer 92. Thus tubes 68 and 76 obtain anode power from D.C. supply 96 through common lead 94. The screen grid of tube 56 is returned through a limiting resistor 104 to screen tap 22. Similarly, the screen of tube 68 is returned through a resistor 106 and the screen of tube 76 is returned through a resistor 108 to the screen tap 22 on the negative terminal of the multivibrator anode power supply.

The secondary of transformer 92 is connected to drive a transistor bank 110 alternately conductive and nonconductive to provide machining pulses across the gap. While the electronic switches employed in the embodiment of this invention are transistors, the invention is not so limited but, with proper redesign of the circuit by one skilled in the art, any electronic switch as previously defined may be substituted. One side of the secondary of transformer 92 is connected to the positive terminal of a network consisting of capacitor 112 shunted by series connected diodes 114. The negative terminal of this network is connected to reference ground 32. The opposite side of the secondary of transformer 92 is connected through a diode 116 to the base of transistor 110. Connected in parallel with diode 116 is a resistor 118 and a capacitor 120.

Transistor 110 is a PNP device and the anode of diode 116 is connected to the base of transistor 110. Diodes 114 are silicon or germanium devices and have a minimum conduction voltage of approximately .6 to .8 volt each. The cathode of this diode string is connected to the negative terminal of capacitor 112 and the number of series connected diodes in the string is chosen to determine the minimum desired bias voltage across capacitor 112.

The emitter of transistor 110 is connected through a balancing resistor 122 to reference ground lead 32. The collector of transistor 110 is connected through a variable power resistor bank 124. The opposite end of this network is connected to a workpiece 128 in this example. Electrode 130 is maintained in spaced proximity to the workpiece by a suitable servo feed system as is known in the electrical discharge machining art. Electrode 130 is connected to the negative terminal of a machining power supply 132. The positive terminal of machining power supply 132 is connected to reference ground 32 thereby completing the discharge loop.

Operation of this circuit is controlled by multivibrator tubes 10 and 12 in the manner previously described. The grid return of this multivibrator is important in a modern electrical discharge machining power circuit because of the wide range of on-off ratio or duty factor required at a particular frequency to control metal removal rate. This is achieved by returning the adjustable tap on rheostat 46 to the fixed D.C. voltage which, in this instance, is the positive terminal of anode supply 18.

As the adjustable tap is moved from side to side, a decrease in resistance 44, for example, produces a corresponding increase in resistance 50, thereby maintaining constant total grid resistance even though each grid circuit varies widely.

It is well known in multivibrator design that the operating period of a multivibrator may be represented by the formula:

$$T = K[C34(R42+R44)+C36(R48+R50)]$$

If coupling capacitors 34 and 36 are equal, the formula may be simplified to:

$$T = K_1[R42+R46+R48]$$

From this simplified formula, it may be seen that as the tap on rheostat 46 is moved from one extreme to the other, resistance is similarly moved from one grid return to the opposing return. Therefore, a constant frequency is maintained regardless of the position of the adjustable tap on rheostat 46, thus achieving a wide range in on-off ratio at a fixed frequency.

The operation of multivibrator tubes 10 and 12 is well known in the electronics industry for given coupling capacitors 34 and 36. To select a different operating frequency, switches 38 and 40 which are normally ganged together as a frequency control, select different capacitors in the respective grid circuits. In this example, six frequency taps are shown. The output of multivibrator tube 12 is produced across plate load resistor 16 and is a substantially rectangular signal having a frequency determined by the composite grid circuit resistance in conjunction with capacitors 34 and 36 and a duty factor determined by the setting of the adjustable tap on rheostat 46.

Another circuit network required to achieve this widely adjustable duty factor is the network for coupling the output of the signal from the multivibrator to successive stages of the amplifier. Analysis of this circuit will show that multivibrator tube 12 and power transistor bank 110 are on or conductive in phase with a discharge across the gap between electrode 130 and workpiece 128. For extremely low duty factor, insufficient power is transferred through a coupling capacitor for proper drive of successive stages of amplification and therefore circuit is required to properly couple the output of the multivibrator to amplifier tube 56.

The proper coupling circuit is achieved through use of reference diode 52 and shunt capacitor 54 for referencing a rectangular or square pulse output developed across signal resistor 16 downward as is required for proper control of the grid of amplifier tube 56. Bias return resistor 58 maintains tube 56 nonconductive during periods of nonconduction of tube 56. This is achieved as multivibrator tube 12 becomes conductive, thereby generating a voltage drop across resistor 16. A typical value for plate supply voltages 18 and 20 is approximately 250 volts total. The drop across multivibrator tube 12 during conduction is approximately 100 volts, therefore generating a signal of approximately 150 volts across resistor 16.

As long as the regulated voltage of reference diode 52 is larger than the drop across tube 12, the control grid of tube 56 will at this time be negative. In the example given, reference diode 52 would have a magnitude of regulation of approximately 200 volts and the control grid of tube 56 would therefore be biased to approximately minus 100 volts. Reference diode 52 and capacitor 54 form a network for producing a floating D.C. voltage having almost no capacitive losses during switching such as would be encountered if a D.C. supply of normal characteristics produced from a transformer winding and rectifiers were employed at this point. The smaller shunt or leakage capacity resulting from this improved network which is floating on the anode of tube 12 to lead 32 or other circuit components, results in far less shunt losses than would occur with a conventional D.C. supply connected at this point.

As multivibrator tube 12 becomes nonconductive, the voltage signal across resistor 16 disappears, thereby carrying the reference diode circuit positive. In this example, with a 250 volt plate supply and a 200 volt reference diode, approximately 50 volts is developed across resistor 60 connected to the control grid of tube 56 since the control grid clips the signal at approximately the same voltage as the cathode of tube 56. An extremely small lead capacitor 64 is connected across resistor 60 for improving the sharp rise and fall characteristics of this signal, thereby causing amplifier 56 to both amplify and resquare the signal as well as decouple the multivibrator from successive stages of amplification.

Rectangular pulsating signal of amplified power is therefore generated across load resistor 65 connected in the anode circuit of tube 56 and is coupled through capacitor 66 to the control grid circuit of tube 68. Diode 70 clamps this pulsating signal to bias 62 and resistor 74 and limits grid current during periods of conduction of tube 68 since the signal developed across resistor 72 is in excess of the bias voltage 62.

Generally the off-time or duration between pulses of the output transistor bank is at least twenty percent of the total signal. In other words, the maximum duty factor is approximately eighty percent compared to a minimum duty factor of approximately one percent. Since tube 56 is therefore conductive for at least twenty percent of the cycle, sufficient power is transferred through coupling capacitor 66 to drive the control grid to tube 68 and a normal coupling circuit may be employed in the control grid circuit of tube 68.

The control grid circuit of tube 76 is driven by the same source of signal as tube 56 and is therefore connected to the reference diode network 52, 54 by lead 78. The drive characteristics of this tube are quite similar to that of tube 56 except that a number of tubes may be employed in parallel in place of tube 76.

Power tube bank 68 is driven On or conductive in phase with the conduction of power transistor 110. Electron flow during drive of transistor 110 is from lead 32 through tube 68 to anode lead 84. During the instant of turn On, electron flow passes through capacitor 88 since there is zero voltage across capacitor 88 at the instant of turn On. Primary 90 of transformer 92 completes the circuit to the positive terminal of drive power supply 96 thus completing the power circuit of tube 68.

Electron flow in the primary 90 of transformer 92 produces a corresponding electron flow in its secondary causing drive current to transistor 110 to flow through diode 116, the base-emitter of transistor 110, balancing resistor 112, bias capacitor 112 to the positive terminal of the secondary winding. During this condition of forward drive to transistor 110, excess voltage across capacitor 112 is limited by the shunt diode network as described above to approximately 2 volts in this example.

Drive current causes transistor 110 to become conductive. If the gap between workpiece 128 and electrode 130 is sufficiently small to permit a gap discharge, electron flow occurs from the negative terminal of discharge power supply 132, electrode 130, workpiece 128, resistor 124, collector-emitter of transistor 110, balancing resistor 112, to the positive terminal of supply 132.

After a period of conduction of transistor 110, the transistor bank is driven off under power by conduction of tube bank 76. Turn Off electron flow occurs in the primary circuit of transformer 92 from lead 32, tube 76, lead 98, limiting resistor 100, primary 102, lead 94 to the positive terminal of drive power supply 96. Conduction of electron flow in this winding is of opposite phasing and causes a reverse current flow in the secondary of transformer 92. During the period of turn Off, electron flow occurs from the secondary of transformer 92 through capacitor 112, balancing resistor 122, emitter-base of transistor 110, capacitor 120, to the opposite side of the secondary of transformer 92. After transistor 110 becomes nonconductive, the emitter-base junction blocks in this polarity and retards further current flow. If this transistor is an alloy junction device or other type having a high reverse voltage rating between emitter and base, electron flow does not continue except for the minute amounts resulting from reverse leakage of the junction. Typical transistors employed in this bank, however, are the diffused junction type and are of such construction that a relatively low voltage in reverse across the base-emitter junction causes reverse conduction. The magnitude of such reverse conduction is limited by resistor 118 since electron flow is blocked by diode 116 and is limited to a value that is safe or non-damaging to transistor 110 and nonsaturating to transformer 92.

Regardless of transistor type, this drive circuit, particularly drive transformer 92 and the current limiting networks, is subject to particular consideration. As mentioned above, the duty factor at a particular frequency can vary widely and in a typical advance machining circuit will vary from a minimum of approximately 1 percent duty factor at a particular frequency to a maximum of approximately 80 or 90 percent duty factor or conduction period of the machining cycle. A transformer, on the other hand, is an A.C. device in which the positive voltage area of either secondary or primary must exactly equal the negative voltage area. It is therefore virtually impossible and certainly impractical to operate transformer 92 in push-pull without saturating its iron core during periods of narrow on-time regardless of the type of transistor utilized. Proper circuit design is required to prevent saturation during periods of wide on-time when the transformer is used to drive a diffused junction transistor having extremely low emitter-base reverse voltage limit.

FIGURE 2 is a schematic showing the short circuit control system previously shown in block form in FIGURE 1. Included in the system is a gap peak voltage sensing network including diode 150 and capacitor 152 serially connected across the gap. Also connected across the gap are resistor 154 and a variable RC network including resistor 156 and capacitor 158. As previously been explained, the machining process may be conducted either at relatively low or relatively high frequencies as predetermined by the setting of tap switches 38, 40 of the multivibrator. Variation may be made of the value of capacitor 158 to provide a different time constant for operation of the sensing network. At high frequencies, a lower value of capacitor 158 is desirable to provide faster response time. At lower frequencies, a higher value of capacitor 158 is required to provide a slower response time. A means is also provided in the control system to provide immediate cut-off of the multivibrator responsive to the sensing of a short circuit condition in the machining gap. This means comprises an electronic switch embodied as transistor 160. Transistor 160 is an NPN transistor connected as shown to a source of positive voltage provided by D.C. source 162, resistors 164–170 as shown. The collector of transistor 160 is further coupled to the grid of multivibrator tube 10 through isolating diodes 172, 174 to provide cut-off of the multivibrator and interruption of machining pulses to the gap.

During normal cutting operation, transistor 160 is maintained in a nonconducting state. To hold transistor 160 off, a voltage is provided from D.C. source 132, with the variable resistance of potentiometer 176 and fixed resistor 178 connected thereacross. Resistor 180 is connected in series with the slidable contact of potentiometer 176 to provide the required negative voltage to the base of transistor 160 for holding it in its nonconductive state. Potentiometer 176 is selectively adjustable to set the reference voltage level to provide stable cutting. One suitable setting for cutting has been found to be of the order of 22 volts. Diodes 182, 184 are connected in series with the output of the peak gap voltage sensing network and connected to the base of transistor 160 as shown. Transistor 160 will be held off until gap voltage drops below 22 volts indicating an abnormal gap condition i.e. a condition approaching short circuit in the machining gap. At that point, the voltage at the base of transistor 160 will turn it on and place a negative voltage of the order of 70 volts on the grid of tube 10 sufficient to turn off the multivibrator.

Provision is also made for pulsing the multivibrator at a substantially lower frequency during the period of gap short circuit as indicated by the sensing network. This has been found to be a highly satisfactory method of reducing the current being supplied to the gap during continuation of the short circuit condition. To provide this lower frequency pulsing of the multivibrator during short circuit gap condition, an A.C. source comprising transformer 186 is employed. A relaxation oscillator employed as the pulser is connected to source 186 through a half wave rectifier 188. The oscillator includes an electronic breakdown device such as four-layer diode with the RC network comprising capacitor 192 and resistors 194, 196. By breakdown device, I mean any device which is triggered into sharp conduction by imposition thereacross of a triggering voltage equal to its breakdown voltage. A potentiometer 198 is connected across secondary windings of transformer 186 as shown to provide a selective adjustment of the firing voltage of four-layer diode 190. The rectified output from transformer 186 is narrowed by the RC network comprising capacitor 192, resistor 194 connected to the negative cathodes of four-layer diode 190. The anode of four-layer diode 190 is connected to a zero potential which may be finished by the main voltage supply over an adjustable RC network. Included in this adjustable RC network are capacitor 199, resistor 200, 204 and potentiometer 202 which potentiometer may be adjusted to regulate the cut-off trigger pulse width. Point P represents a zero voltage potential. The trigger pulse width determines the short circuit current desirable for each tap setting i.e. at minimum and maximum settings of the removal rate control. To provide this feature potentiometer 202 has its movable contacts ganged for operation in conjunction with potentiometer 46 of the FIGURE 1 circuit. Potentiometer 46 is used to selectively preset the gap machining pulse on-time or duty factor. As has been explained hereinbefore, according to the movement of the slider of potentiometer 46, the pulse on-off times are inversely varied one relative to the other. Potentiometer 202 is ganged with potentiometer 46 so that as the pulse off-time is increased, the width of the cut-off trigger pulse is relatively increased. For settings of relatively narrow off-time, the width of the cut-off trigger pulse is correspondingly narrowed. This will insure turn-off of pulses of low frequency and wide off-time.

Each time the rectified voltage across four-layer diode 190 reaches its breakdown point, it will conduct rapidly and transmit a voltage spike shaped to the correct height and width by the series RC shaping network including capacitor 206 and resistor 208, 210. This network is particularly important in the event of failure of four-layer diode 190. If four-layer diode 190 latches closed, the network will limit the short circuit current that can pass which might cause damage to the transistor 110. The series RC network also serves the important function of protecting the circuit against the effect of line voltage variations. If any portion of the pulsing network associated with the relaxation oscillator should fail, then, on any following short circuit, transistor 160 will turn on and hold the multivibrator off. This signal is furnished through diode 212 to the base of transistor 160 to turn it off. So long as short circuit conditions prevail in the gap, transistor 160 will be biased off again by the output of the relaxation oscillator. When the gap voltage sensed rises a predetermined amount, transistor 160 will remain off and the multivibrator will be permitted to operate in its normal manner to provide high frequency machining pulses to the gap.

*Description of operation*

The power supply circuit as shown in FIGURE 1 has the capability of providing machining pulses to the gap at predetermined frequency and at selectively variable on-off ratio so that the metal removal rate and surface finish are precisely controllable by the operator. Upon occurrence of a gap short circuit condition, it is imperative that the current being furnished to the gap be immediately reduced in a controllable manner. I have found that a highly improved protective circuit is one in which the pulses furnished by the multivibrator tubes 10, 12 are first interrupted by a cut-off switch, transistor 160. Transistor 160 is normally biased off until the gap peak voltage as sensed by the network comprising diode 150 and capacitor 152 drops below the preset reference which may be, for example, of the order of 22 volts. At this point, the voltage on the base of transistor 160 turns it on. This immediately provides a high negative voltage to the grid of multivibrator tube 10 to turn it off and interrupt the operation of tubes 68, 76 and transistor 110. In this manner, the machining pulses furnished to the gap are interrupted. The relaxation oscillator of FIGURE 2 is a continually operating pulsing means. The frequency of triggering of four-layer diode 190 is controlled and preset by AC source 186. While a low frequency rate of 60 c.p.s. is provided through half wave rectifier 188, the invention is not limited to that value but low frequency values of 15 or even 120 c.p.s. may also provide acceptable operation. The pulses furnished to the base of transistor 160 from four-layer diode 190 through the shaping network provided are of negative polarity to turn it off and of extremely short duration as has been above described. Therefore, the control pulses furnished to the multivibrator tubes and to the gap switching means-transistor 110 are not only of very low frequency but also of substantially reduced on-time to reduce further the current content of the pulses furnished to the gap during short circuit condition. So long as the output from the sensing network remains at a level indicative of abnormal gap characteristic, transistor 160 will be triggered alternately on and off. When the output from the sensing network increases above the reference level, transistor 160 will be held off, the high negative voltage to the grid of tube 10 will be removed, and the multivibrator will operate at its normal rate as preset by capacitor switches 34, 36. The response time of the system may be set as desired by the adjustment of gap capacitor 158. For relatively high frequencies of operation, a low value of capacitor 158 is desirable.

It will thus be seen that I have provided a new and improved means for short circuit protection in electrical discharge machining.

I claim:

1. In an apparatus for machining a conductive workpiece by electrical discharge across a dielectric coolant filled gap between a tool electrode and the workpiece, a power source, an electronic switch having a control electrode and a pair of principal electrodes, said principal electrodes connected to said source and to said gap, a first means operatively connected to said control electrode of said switch for pulsing it with variable on and off time pulses to provide discrete gap discharges, a sensing means for providing a signal output responsive to abnormal gap characteristic, a cut-off means operatively connected to said sensing means and to said control electrode of said switch for interrupting its operation responsive to said output, a second means for providing variable duration cut-off pulses to said cut-off means and said switch at substantially lower frequency responsive to said output, and means conjointly operable to vary directly the time duration of said cut-off pulses relative to the off-time of said first mentioned pulses.

2. The combination as set forth in claim 1 wherein said first pulsing means comprises a multivibrator including a pair of electronic switches coupled for alternate operation and in which said cut-off means comprises an electronic cut-off switch having a principal electrode operatively connected to the control electrode of one of said multivibrator switches.

3. The combination as set forth in claim 1 wherein said second pulsing means comprises a relaxation oscillator including a four-layer diode.

4. In an apparatus for machining a conductive workpiece by electrical discharge across a dielectric coolant filled gap between a tool electrode and the workpiece, a power source, an electronic switch having a control electrode and a pair of principal electrodes, said principal electrodes connected to said source and said gap, a first means operatively connected to said control electrode of said switch for pulsing at a predetermined frequency with pulses of variable on and off time to provide discrete gap discharges, a sensing means for providing a signal output responsive to abnormal gap characteristic, a second means operable responsive to said signal output for providing variable duration cut-off pulses to said first pulsing means at a substantially reduced frequency to interrupt its operation, and means for directly varying the time duration of said cut-off pulses relative to the off time of said first mentioned pulses.

5. The combination as set forth in claim 4 wherein said second pulsing means includes an electronic breakdown device and a source of A.C. operatively connected thereto for firing it and a series RC network connected in the output of said breakdown device.

6. The combination as set forth in claim 4 wherein said first pulsing means comprises a multivibrator including a pair of electronic switches coupled for alternate operation through a variable resistance-capacitor network, wherein said second pulser includes a variable resistance-capacitor network for controlling said cut-off pulse duration, and wherein said last mentioned means comprises a means for conjointly varying said resistances.

7. In an apparatus for machining a conductive workpiece by electrical discharge across a dielectric coolant filled gap between a tool electrode and the workpiece, a power source, an electronic switching means having a control electrode and a pair of principal electrodes, said principal electrodes connected to said source and to said gap, a first means operatively connected to said control electrode of said switching means for pulsing it at a predetermined frequency with variable on and off time pulses to provide discrete gap discharges, a sensing means for providing a signal output responsive to abnormal gap characteristic, an electronic cut-off switch having a control electrode and operatively connected between said sensing means and said first pulsing means for interrupting its operation responsive to said output, a periodically operable electronic breakdown device operated at a substantially lower frequency and an RC network operatively connected between said device and said control electrode of said cut-off switch for providing cut-off pulses thereto, and means for directly varying the duration of said cut-off pulses relative to the off time of said first mentioned pulses.

8. In an apparatus for machining a conductive workpiece by electrical discharge across a dielectric coolant filled gap between a tool electrode and the workpiece, a power source, means operatively connected to said source and to said gap for providing discrete electrical discharges thereto, a first pulsing means for initiating the operation of said means with pulses of variable on and off time at a predetermined frequency, a sensing means for providing a signal output responsive to abnormal gap characteristic, a cut-off means operatively connected between said sensing means and said first pulsing means for interrupting its operation responsive to said output, a second pulsing means operatively connected to and controlling the operation of said cut-off means for pulsing it and said first pulsing means with variable duration cut-off pulses at a substantially reduced frequency, and means for directly varying the duration of said cut-off pulses relative to the off time of said first mentioned pulses.

References Cited

UNITED STATES PATENTS

| | | | |
|---|---|---|---|
| 2,951,969 | 9/1960 | Matulaitis et al. | 219—69 X |
| 3,243,567 | 3/1966 | Lobur | 319—69 X |
| 3,292,040 | 12/1966 | Ullmann et al. | 219—69 X |

RICHARD M. WOOD, *Primary Examiner.*

R. F. STAUBLY, *Assistant Examiner.*